(12) United States Patent
Castleman et al.

(10) Patent No.: US 11,845,346 B2
(45) Date of Patent: Dec. 19, 2023

(54) CARRIER ASSEMBLY FOR MULTIPLE FUEL CELLS

(71) Applicant: Toyota Motor Engineering & Manufacturing North America, Inc., Plano, TX (US)

(72) Inventors: William N. Castleman, Canton, MI (US); Colin Kimber, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 311 days.

(21) Appl. No.: 17/172,199

(22) Filed: Feb. 10, 2021

(65) Prior Publication Data

US 2022/0250485 A1 Aug. 11, 2022

(51) Int. Cl.
*B60L 50/71* (2019.01)
*B62D 21/03* (2006.01)
*B60K 1/00* (2006.01)
*B62D 29/00* (2006.01)
*B62D 24/00* (2006.01)

(52) U.S. Cl.
CPC ............ *B60L 50/71* (2019.02); *B60K 1/00* (2013.01); *B62D 21/03* (2013.01); *B62D 24/00* (2013.01); *B62D 29/007* (2013.01); *B60L 2200/36* (2013.01)

(58) Field of Classification Search
CPC ....... B60L 50/71; B60L 2200/36; B60K 1/00; B60K 1/04
See application file for complete search history.

(56) References Cited

U.S. PATENT DOCUMENTS

| | | | | |
|---|---|---|---|---|
| 5,193,635 A | * | 3/1993 | Mizuno | H01M 16/006 180/65.265 |
| 7,338,335 B1 | * | 3/2008 | Messano | B60H 1/00428 903/903 |
| 7,393,016 B2 | * | 7/2008 | Mitsui | B62D 25/08 180/312 |

(Continued)

FOREIGN PATENT DOCUMENTS

WO 2008049204 A1 5/2008

*Primary Examiner* — Frank B Vanaman
(74) *Attorney, Agent, or Firm* — Christopher G. Darrow; Darrow Mustafa PC (57) ABSTRACT

A single powertrain carrier assembly is provided for mounting or removing multiple fuel cell assemblies in or from an engine bay compartment of a heavy duty truck at the same time. The powertrain carrier assembly can be mounted in new heavy duty trucks, or retrofit into preexisting heavy duty trucks, for example, replacing a diesel engine. The assembly may be provided with a three point mounting system for securing it to a chassis frame, including one front and two angled rear attachment points. In one aspect, the assembly includes a frame structure defining a carrier platform and with lower brackets to secure a first fuel cell assembly below the carrier platform, and upper brackets to secure a second fuel cell assembly above the carrier platform. In another aspect, the assembly includes a frame structure defining lower and upper cavity portions to retain the first and second fuel cell assemblies.

19 Claims, 11 Drawing Sheets

(56) References Cited

U.S. PATENT DOCUMENTS

| | | | |
|---|---|---|---|
| 7,726,429 B2* | 6/2010 | Suzuki | B62D 21/152 |
| | | | 180/232 |
| 10,442,297 B2 | 10/2019 | Brown et al. | |
| 10,493,837 B1 | 12/2019 | Angelo et al. | |
| 10,556,622 B1 | 2/2020 | Calliari et al. | |
| 2005/0048348 A1* | 3/2005 | Bazzarella | H01M 8/2484 |
| | | | 429/457 |
| 2005/0158606 A1* | 7/2005 | Xia | H01M 8/247 |
| | | | 429/96 |
| 2008/0173489 A1* | 7/2008 | Takasaki | B60K 1/04 |
| | | | 180/68.5 |
| 2011/0269052 A1* | 11/2011 | Haltiner, Jr | H01M 8/2483 |
| | | | 429/458 |
| 2012/0031695 A1* | 2/2012 | Tsuchiya | B60L 58/26 |
| | | | 180/68.5 |
| 2012/0175177 A1* | 7/2012 | Lee | B60K 1/04 |
| | | | 180/68.5 |
| 2021/0155224 A1* | 5/2021 | McKibben | B60L 58/40 |
| 2021/0257647 A1* | 8/2021 | Ohhashi | H01M 8/0273 |

* cited by examiner

CARRIER ASSEMBLY FOR MULTIPLE FUEL CELLS

TECHNICAL FIELD

The present disclosure generally relates to vehicles with fuel cell powertrains and, more particularly, to improved carrier assemblies for multiple fuel cells.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Many vehicles are electrified vehicles or, in other words, vehicles that have an electrified powertrain. The typical electrified vehicle has a more or less traditional drivetrain. Specifically, as part of the drivetrain, the electrified vehicle includes one or more wheels, as well as a transmission, a differential, a drive shaft and the like, to which the wheels are mechanically connected. However, in place of a gas or diesel internal combustion engine, the electrified vehicle includes one or more electric powered motors. As part of the electrified powertrain, the drivetrain is mechanically connected to the motors. In conjunction with the drivetrain, the motors are operable to power the wheels using electrical energy. Many electrified vehicles are fuel cell vehicles (FCVs) or, electrified vehicles that include one or more fuel cell stacks/assemblies. In FCVs, the fuel cell stacks/assemblies are operable to generate the electrical energy used by the motors to power the wheels.

Due to their size and weight, larger vehicles, such as heavy duty trucks, have increased power/load requirements, and may need a plurality of fuel cell stacks/assemblies for meaningful operations and purposes of realizing the capacity to satisfy the energy demand requirements, as well as the capacity to satisfy the propulsion demand requirements.

Fuel cell stacks/assemblies may be ultimately coupled to a frame component of the vehicle. Accordingly, it would be desirable to provide an improved assembly and design for easily installing and removing multiple fuel cell stacks/assemblies from a vehicle in a single process for improved serviceability.

SUMMARY

This section provides a general summary of the disclosure, and is not a comprehensive disclosure of its full scope or all of its features.

In various aspects, the present teachings provide a powertrain carrier assembly for mounting multiple fuel cell assemblies together in a heavy duty truck. The powertrain carrier assembly has a frame structure including a plurality of interconnected structural elements defining a carrier platform. A front body attachment plate is coupled substantially perpendicular to the frame structure and extending a distance below the carrier platform. A pair of rear body attachment brackets are provided for coupling to opposing sides of a chassis frame. A plurality of lower brackets are fixed to the frame structure and configured to secure a first fuel cell assembly below the carrier platform. A plurality of upper brackets are fixed to the frame structure and configured to secure a second fuel cell assembly above the carrier platform.

In other aspects, the present teachings provide a powertrain carrier assembly for retrofitting multiple fuel cell assemblies into a preexisting engine bay compartment of a heavy duty truck. The powertrain carrier assembly has a frame structure including a plurality of interconnected structural elements. The frame structure defines a lower interior cavity portion configured to retain a first fuel cell assembly within a lower region of the frame structure. The frame structure also defines an upper interior cavity portion configured to retain a second fuel cell assembly within an upper region of the frame structure. A front body attachment bracket is provided, configured to secure a front portion of the powertrain carrier assembly to a preexisting mounting point on a chassis frame cross member of the heavy duty truck. A pair of opposing rear body angled attachment brackets are provided, configured to secure a rear portion of the powertrain carrier assembly to preexisting frame rail motor mounts of the heavy duty truck.

In still other aspects, the present teachings provide an electric powertrain heavy duty truck. The heavy duty truck includes a chassis frame provided with first and second opposing side frame rails. A plurality of frame cross members are provided, coupled to the side frame rails. The heavy duty truck defines an engine bay compartment to house first and second fuel cell assemblies. A single powertrain carrier assembly is provided for mounting or removing multiple fuel cell assemblies in or from the engine bay compartment at the same time. The carrier assembly may be provided with a three point mounting system for securing it to a chassis frame, including one front and two angled rear attachment points. In one aspect, the carrier assembly includes a frame structure defining a carrier platform with lower brackets to secure a first fuel cell assembly below the carrier platform, and upper brackets to secure a second fuel cell assembly above the carrier platform. In another aspect, the carrier assembly includes a frame structure defining lower and upper cavity portions to respectively retain the first and second fuel cell assemblies.

Further areas of applicability and various methods of enhancing the disclosed technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide a single powertrain carrier assembly for mounting or removing multiple fuel cell assemblies in or from an engine bay compartment of a heavy duty truck at the same time. The powertrain carrier assembly can be used in newly built/assembled heavy duty trucks, or it can be retrofit into preexisting heavy duty trucks, for example, replacing a diesel engine of a heavy duty truck. The powertrain carrier assembly may be provided with a three point mounting system for securing it to a frame chassis. The three point mounting system may include one front and two angled rear attachment points such that it can secure to preexisting mounting points of the frame chassis, for example, mounting points that may be used for securing a typical diesel engine. The powertrain carrier assembly can be configured for use with different fuel cell assembly designs, for example, having different specifications and power output. As will be explained in more detail below, in one aspect, the powertrain carrier assembly includes a frame structure defining a carrier platform and with lower brackets to secure a first fuel cell assembly below the carrier platform, and upper brackets to secure a second fuel cell assembly above the carrier platform. In another aspect, the powertrain carrier assembly includes a frame structure defining lower and upper cavity portions to retain the first and second fuel cell assemblies.

Figure 1:
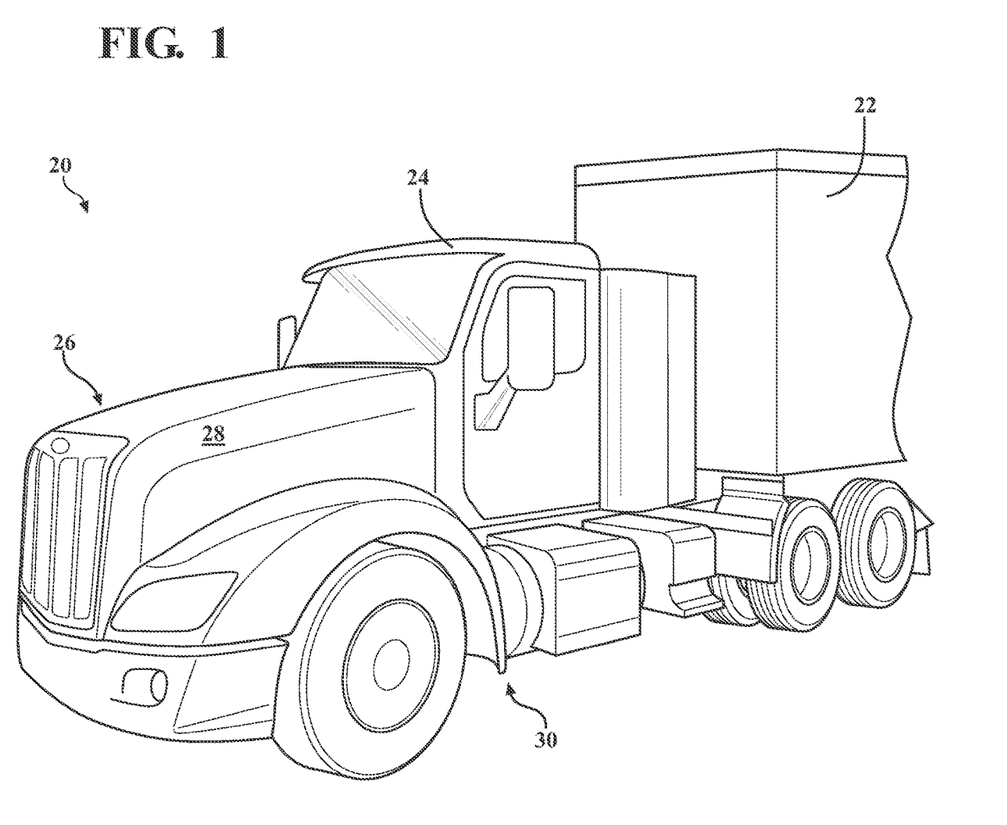
FIG. 1 is a perspective front view of a portion of an exemplary heavy duty truck vehicle providing an environmental view including an enclosed engine bay compartment.

More specifically, the powertrain carrier assembly of the present technology adds the functionality of being able to easily permit multiple fuel cell assemblies to be installed to a vehicle, such as a heavy duty truck, as a single unit/component for assembly build efficiency and a high degree of repeatability. The present technology utilizes a high strength steel structure and bracketry in order to secure multiple fuel cell assemblies and their adjoining components. The powertrain carrier assembly may be secured to the frame of the vehicle as a single sub-assembly or process, with multiple fuel cell assemblies installed (or removed) in unison, and preferably using original equipment manufacturer (OEM) standard installation (or removal) methods and sequences. With reference to the accompanying drawings, FIG. 1 is a perspective front view of a portion of exemplary vehicle, specifically a heavy duty truck 20, and provides an environmental view of a semitrailer 22, a passenger compartment 24, and front engine component area 26, including an enclosed engine bay compartment 28. The heavy duty truck 20 is depicted as what may be commonly referred to as a semi-tractor or, in other words, a tractor unit that, together with the hitched semitrailer 22, forms a semi-truck. The semitrailer 22 has an exterior and, as an interior compartment, a cargo compartment for carrying cargo. The heavy duty truck 20 has an exterior and a number of interior compartments. The heavy duty truck 20 may include, among other things, seats and a dash assembly housed in its passenger compartment 24. In addition to the passenger compartment 24, the heavy duty truck 20 has a frame chassis 30 (details not specifically shown in FIG. 1) that serves as an underbody and forms a part of the exterior. With the semitrailer 22 hitched to the heavy duty truck 20, the heavy duty truck is operable to pull the semitrailer 22 and any onboard cargo.

While the various drawings and descriptions provided herein may specifically make reference to a heavy duty truck type of vehicle, it should be understood that the present technology may also be useful with other large vehicles, such as buses, trams, trains, hybrids or combinations, military vehicles, utility vehicles, refuse vehicles, construction vehicles, agricultural vehicles, and the like. With respect to heavy duty trucks, this may specifically include class 6-class 8 type trucks. Truck classifications are typically based upon the maximum loaded weight of the truck, typically using the gross vehicle weight rating (GVWR) and sometimes also the gross trailer weight rating (GTWR), and can vary among jurisdictions. In the United States, a general reference to class 6-class 8 trucks includes the medium and heavy duty use vehicles denoted by the Federal Highway Administration, with weight limits of generally about 19,501 lbs. and above. In the European Union, similar vehicles may be designated as classes C for trucks (lorries), D for buses, or E for larger trailers.

As a vehicle having an electric powertrain, the vehicles using the present technology will also include many other components that are not necessarily shown herein, but may be required for the typical operation. For example, the vehicle includes a motor assembly supported by the frame chassis, and a drivetrain supported by the frame chassis. The motor assembly may include multiple motors and a common output coupling. The motors may be axially integrated for codependent spinning action, and support the output coupling for rotation. The drivetrain may include a number of wheels, and is mechanically connected to the output coupling. The vehicle may additionally include a first fuel cell assembly, a first motor belonging to the motor assembly, a second fuel cell assembly, and a second motor belonging to the motor assembly. The fuel cell assemblies are operable to generate electrical energy using hydrogen and oxygen as fuel. In one example, the first motor may be electrically connected to the first fuel cell assembly, and operable to spin using electrical energy from the first fuel cell assembly, while the second motor may be electrically connected to the second fuel cell assembly, and operable to spin using electrical energy from the second fuel cell assembly. Accordingly, the first motor and the second motor are operable to contributorily spin the output coupling, and thereby contributorily power the at least one wheel, using electrical energy from the first and second fuel cell assemblies. In other examples, the output from the two fuel cell assemblies can be combined to provide electrical energy to one or more motors and/or high voltage batteries.

Figure 2:
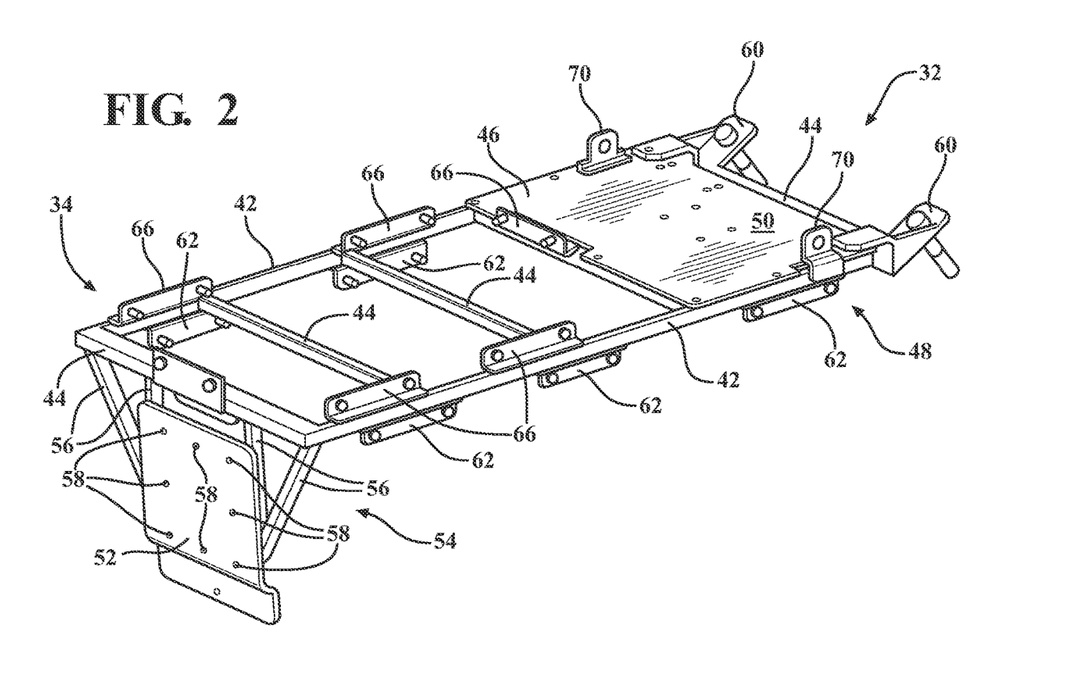
FIG. 2 is an isometric view of an exemplary powertrain carrier assembly according to one aspect of the present technology.
Figure 3:
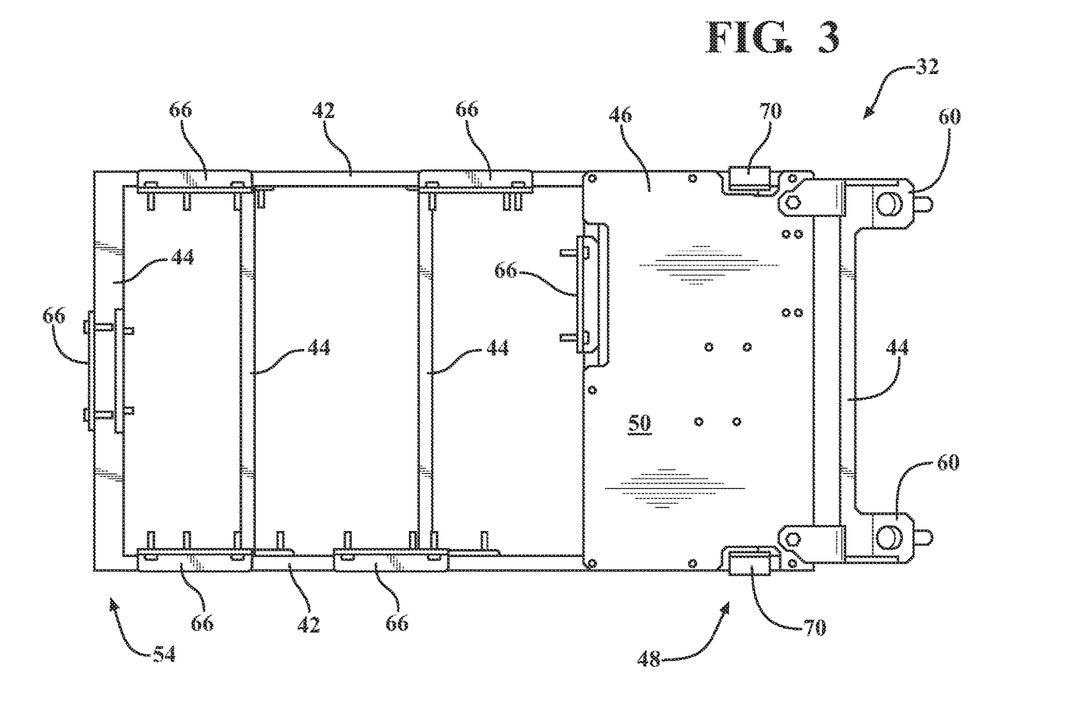
FIG. 3 is a top plan view of the powertrain carrier assembly of FIG. 2.
Figure 4:
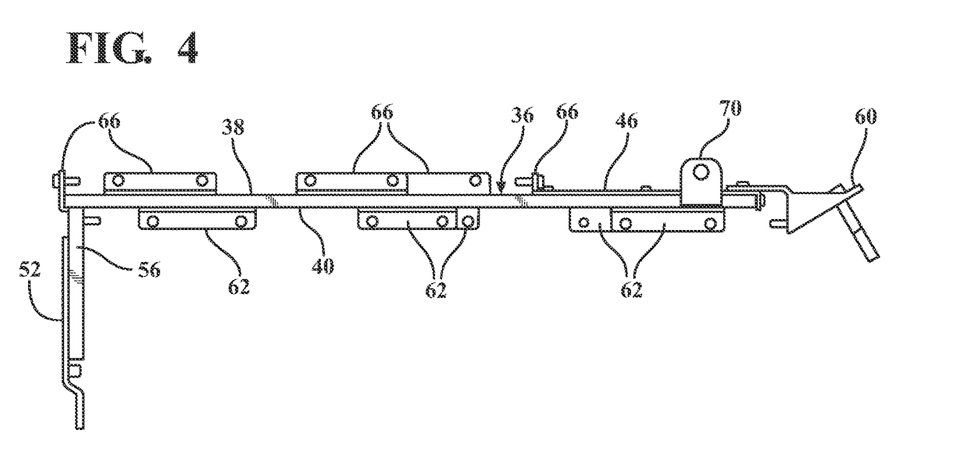
FIG. 4 is a side plan view of the powertrain carrier assembly of FIG. 2.

FIG. 2 is an isometric view of an exemplary powertrain carrier assembly 32 according to one aspect of the present technology. FIG. 3 is a top plan view of the powertrain carrier assembly 32 of FIG. 2; and FIG. 4 is a side plan view of the powertrain carrier assembly 32 of FIG. 2. As shown with reference to FIGS. 2-4, the powertrain carrier assembly 32 has a frame structure 34 including a plurality of interconnected structural elements that may cooperate to define a carrier platform 36. The carrier platform provides a generally planar and substantially horizontal upper and lower mounting surface areas 38, 40. In various aspects, the interconnected structural elements of the frame structure 34 may be made of a particularly high strength steel, or similar high strength material suitable for use within the engine compartment. Exemplary structural elements may include a pair of opposing side rails 42 and a plurality of spaced-apart cross members 44 coupled to the opposing side rails 42. In various aspects, the structural elements may include at least one frame plate 46 coupled to a rear portion 48 of the frame structure 34 and defining a mounting surface 50 for other components to be attached.

In various aspects, the installation of the powertrain carrier assembly 32 can include the use of a three point mounting system. This can include one front mount and two rear mount locations. In this regard, a front body attachment plate 52 can provided, secured to a front portion 54 of the powertrain carrier assembly 32. As best shown in FIGS. 2 and 4, a number of additional cross members 56 can be used to brace, support, and couple the front body attachment plate 52 to the frame structure 34 in a manner such that it may be substantially perpendicular to the frame structure, and in various aspects, extending a distance below the carrier platform 36. The front body attachment plate 52 may be used as a single mount point, and can be provided defining a mounting pattern of apertures 58 configured to accommodate a secure connection to a variety of different original equipment manufacturer (OEM) carrier attachment brackets for ultimately connecting to the frame chassis 30, as discussed in more detail below with respect to FIG. 9. The powertrain carrier assembly 32 may additionally include a pair of rear body attachment brackets 60 for ultimate coupling with the opposing frame rails of the frame chassis 30, as discussed in more detail below with respect to FIG. 10. These rear mounting points are generally symmetrical. In various aspects, the rear body attachment brackets 60 may be angled with respect to the generally planar and substantially horizontal upper and lower mounting surface areas 38, 40 (FIGS. 2 and 4). The rear attachment brackets may be a part of, or integrated with, a rear cross member 44. In order to couple and secure the fuel cell assemblies to the respective upper and lower mounting surface areas 38, 40 of the carrier platform 36, various mounting brackets and fasteners may be used. As shown in FIGS. 2-4, in one aspect, a plurality of lower brackets 62 may be provided fixed to the frame structure 34, for example, to the opposing side rails 42, and are configured to secure a first fuel cell assembly 64 that extends a distance below the carrier platform 36. A plurality of upper brackets 66 may be provided fixed to the frame structure 34, for example, to the opposing side rails 42, and are configured to secure a second fuel cell assembly 68 that extends a distance above the carrier platform 36.

Figure 5:
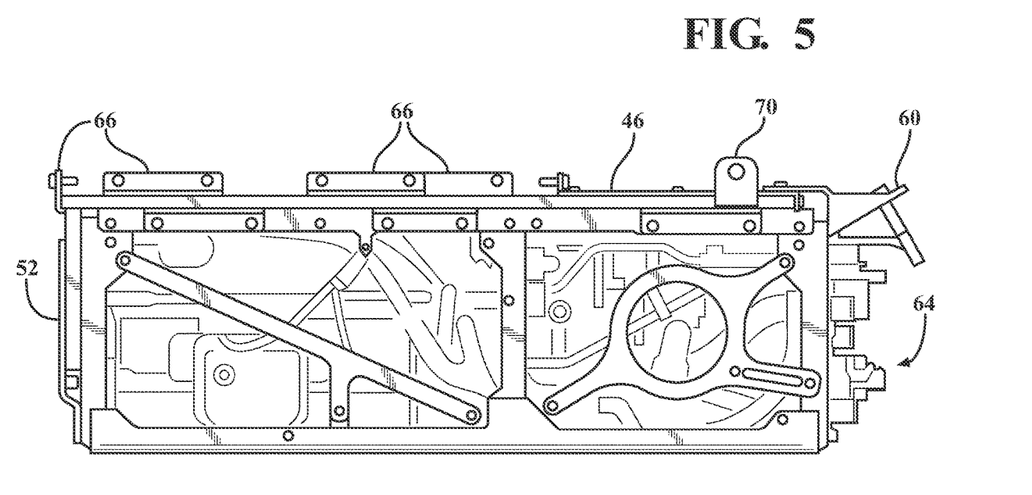
FIG. 5 illustrates the side plan view of the powertrain carrier assembly of FIG. 4 including a first fuel assembly secured below a carrier platform.
Figure 6:
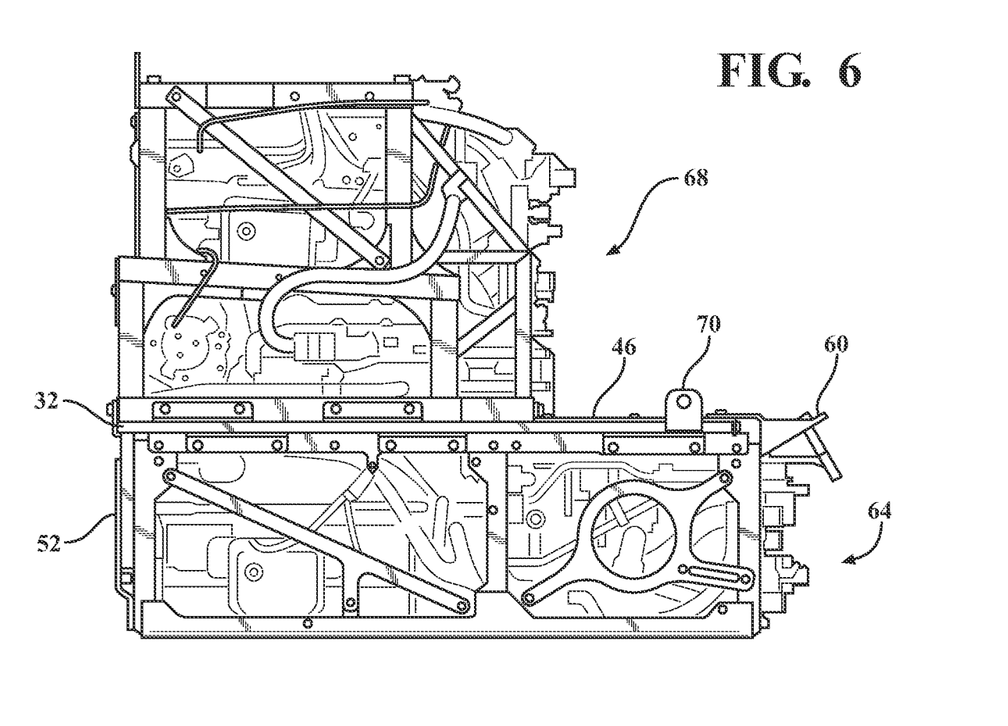
FIG. 6 illustrates the side plan view of the powertrain carrier assembly of FIG. 5 further including a second fuel assembly secured above the carrier platform.
Figure 7:
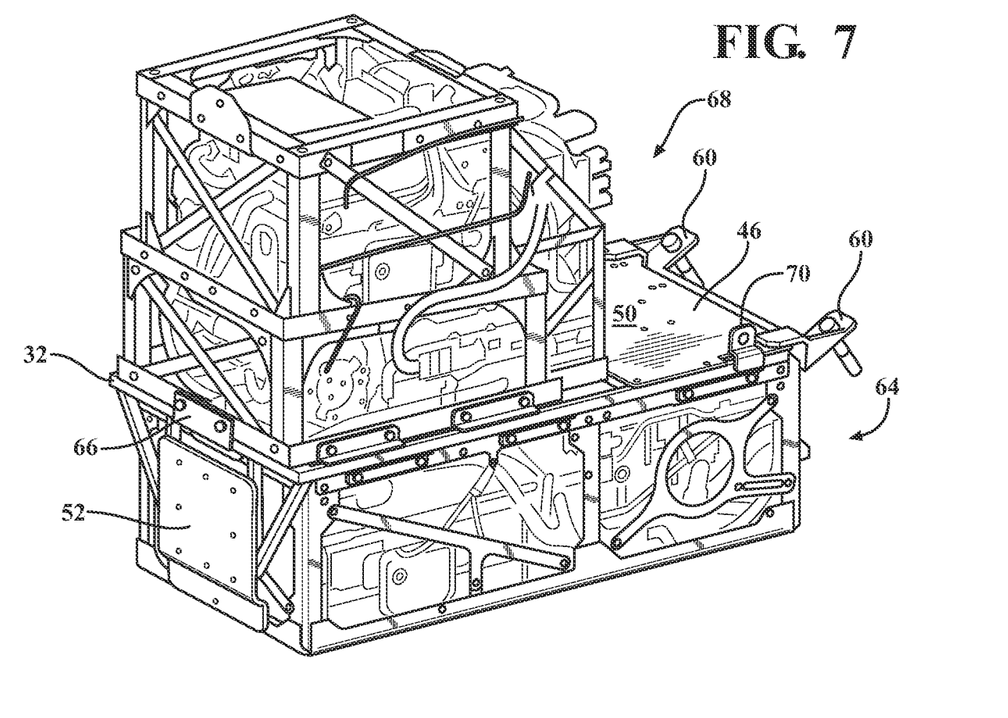
FIG. 7 is an isometric view of the assembly provided in FIG. 6.

FIG. 5 illustrates the side plan view of the powertrain carrier assembly of FIG. 4 including a first fuel assembly 64 secured below the carrier platform 36. FIG. 6 illustrates the side plan view of the powertrain carrier assembly of FIG. 5 further including a second fuel cell assembly 68 secured above the carrier platform 36. FIG. 7 is an isometric view of the assembly provided in FIG. 6, which may be referred to as a multiple fuel cell kit. The first and second fuel cell assemblies 64, 68 may include various frame components of their own that may be secured to the lower and upper brackets 62, 66 of the powertrain carrier assembly 32.

As used herein, the term "fuel cell assembly" is not meant to be limiting and generally refers to a modular type of assembly, kit, or grouping of main components and peripheral components for operating a fuel cell stack in order to generate electricity. For example, this may include a plurality of individual fuel cells located within a housing and including various components, such as inlets and outlets, fluid circuits, heaters, coolers, exchangers, humidifiers, hoses, connections valves, couplings, pumps, blowers, filters, junction boxes, electrical components, sensors, etc. Various quick connect types features may be provided to easily connect with other vehicle systems, including electrical systems, fuel systems, cooling systems, and the like. While various aspects of the powertrain carrier assemblies may be discussed or shown in the drawings as having one or two fuel cell assemblies, additional fuel cell assemblies can also be used, depending on the design and power output requirements. Still further, it is envisioned that more than one powertrain carrier assembly may be used in a single vehicle.

Figure 8:
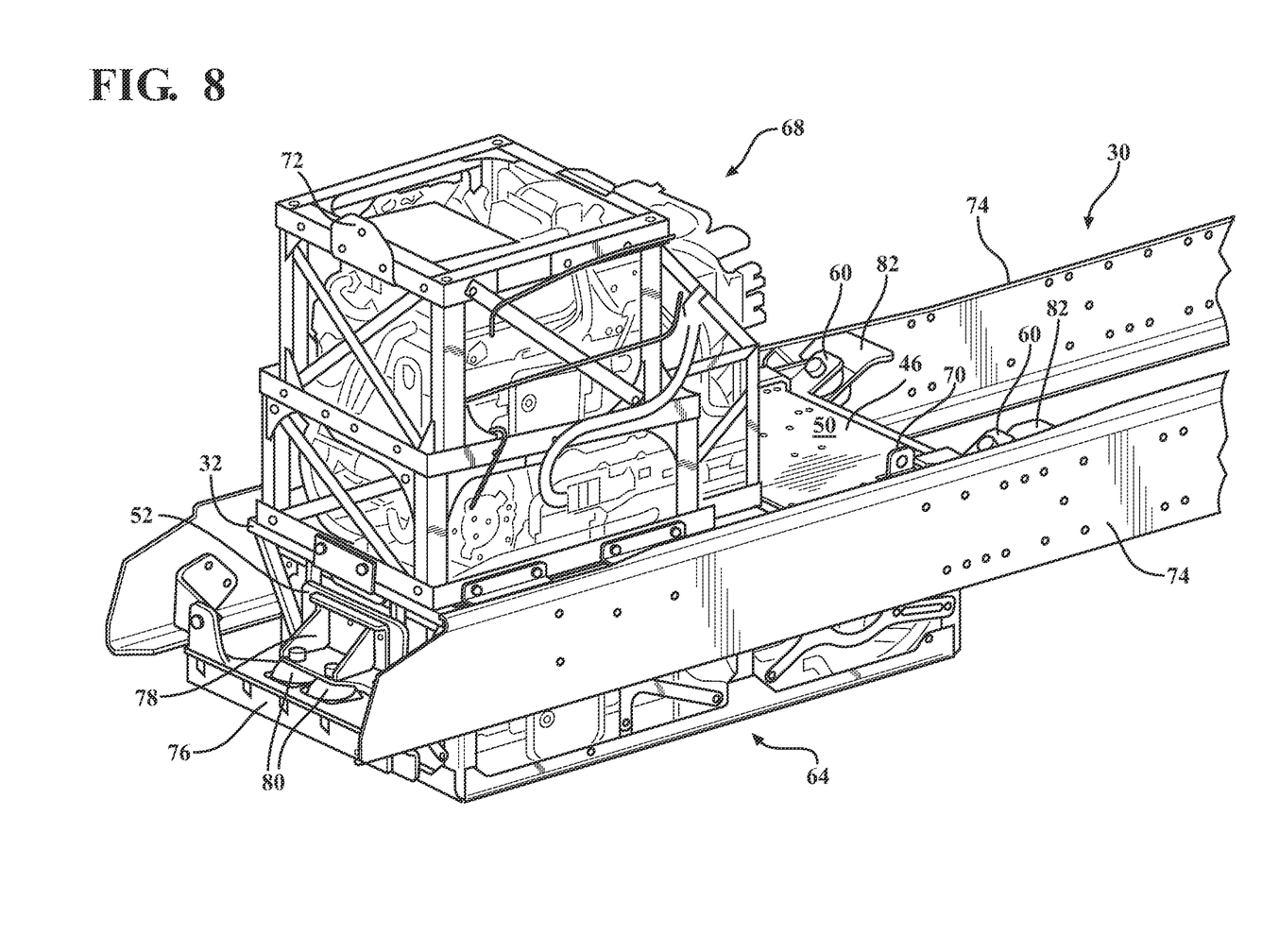
FIG. 8 illustrates the assembly of FIGS. 6 and 7 mounted to a frame chassis of a heavy duty truck.

FIG. 8 illustrates the assembly of FIGS. 6 and 7 being mounted to a frame chassis 30 of a heavy duty truck. In various aspects, a three point hoist lift system may be used to move the powertrain carrier assembly 32 loaded with the fuel cell assemblies into the appropriate location prior to completing the installation process, where it is connected to the chassis frame components of the heavy duty truck, specifically to opposing frame rails 74 and a front frame cross member 76 extending between the two opposing frame rails 74. In this regard, the frame structure 34 may include a pair of hoist lift connection brackets 70 coupled to a rear portion 48 of the frame structure 34. A third hoist lift connection bracket 72 can be provided at an upper location of the second fuel cell assembly 68.

Figure 9:
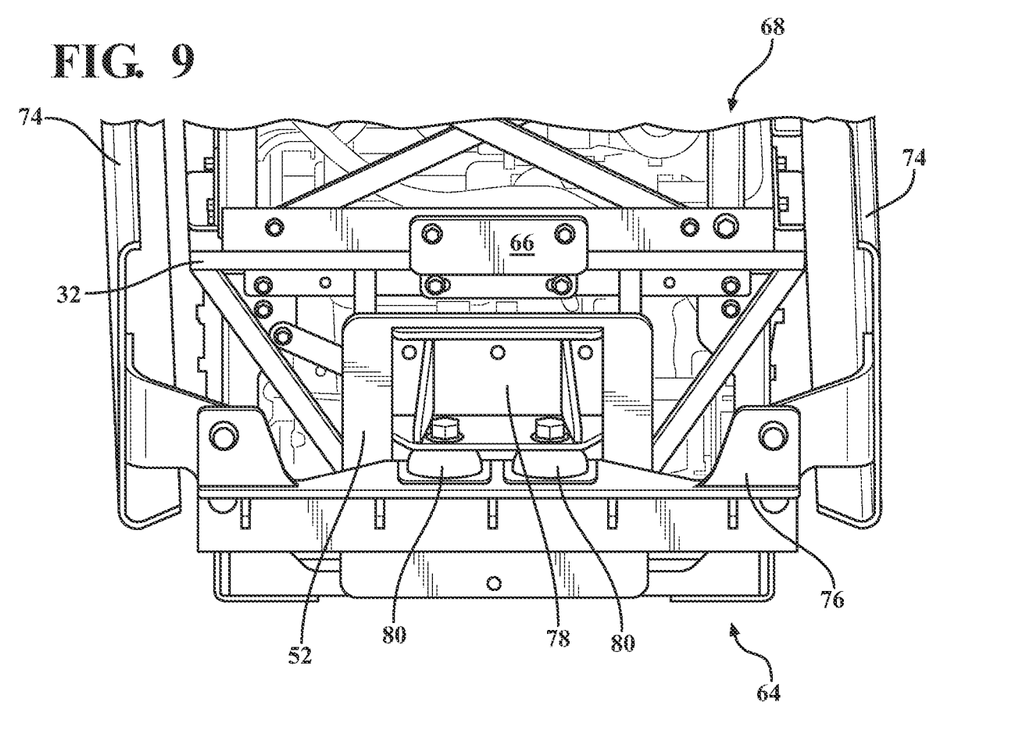
FIG. 9 is a partial front plan view of the assembly of FIG. 8, illustrating details of the front body attachment to a frame cross member of the frame chassis.

FIG. 9 is a partial front plan view of the assembly of FIG. 8, illustrating details of the front body attachment plate 52 being secured to a front frame cross member 76 of the frame chassis 30. With different types and designs of structures defining the fuel cell assemblies, in combination with being used with different vehicle chassis frame designs, a custom carrier attachment bracket 78 may be used, coupled to the front body attachment plate 52, where the carrier attachment bracket 78 is configured to ultimately secure the front portion of the powertrain carrier assembly 32 to the frame component of the heavy duty truck. In various aspects, the frame component can be a front frame cross member 76 of the frame chassis 30 with a preexisting mounting point. For example, the mounting point may be a mounting point previously used for a diesel engine. In this regard, the powertrain carrier assembly may be more easily retrofitted with a new powertrain. In various aspects, at least one isolator component 80 may be provided, disposed between the carrier attachment bracket 78 and the mounting point or frame component 76.

Figure 10:
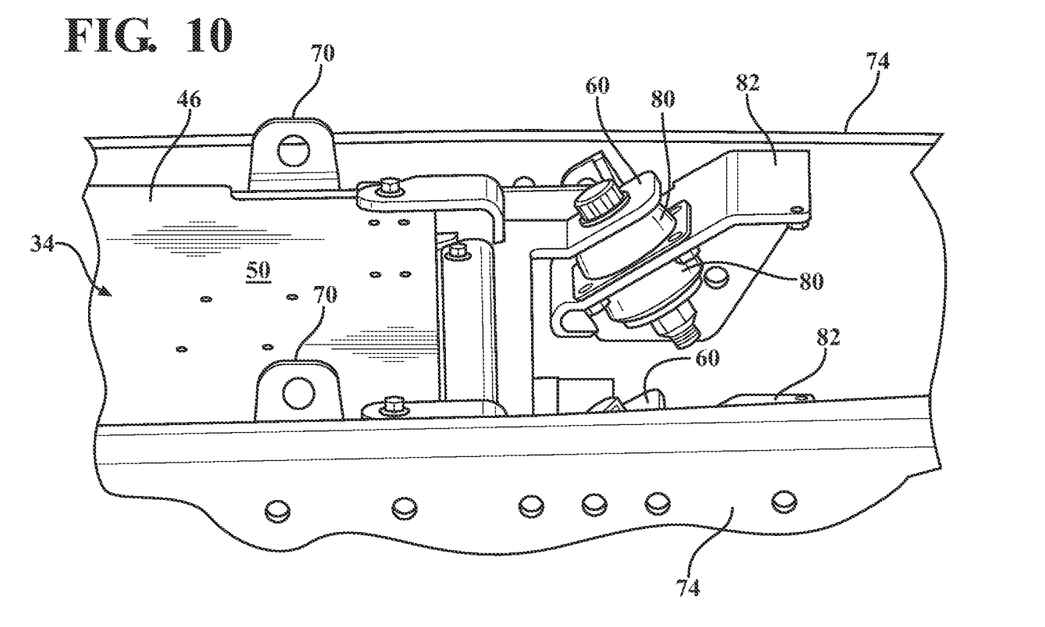
FIG. 10 is a partial isometric view of the assembly of FIG. 8, illustrating details of the rear body attachment to opposing frame rails of the frame chassis.

FIG. 10 is a partial isometric view of the assembly of FIG. 8, illustrating details of the rear body attachment to opposing frame rails 74 of the frame chassis 30. As specifically shown in FIG. 10, the pair of angled rear body attachment brackets 60 secure the rear portion 48 of the frame structure 34 to angled frame rail motor mounts 82 extending from the opposing frame rails 74. In various aspects, the frame rail motor mounts 82 are preexisting mounting points, for example, which may have been used with a diesel engine. At least one isolator component 80 may be provided, disposed between the angled rear body attachment brackets 60 and the angled frame rail motor mounts 82. In certain other embodiments where the packaging arrangements allow, it may be desired to couple at least one portion of the rear body of the powertrain to a frame cross member of the chassis as an alternative to, or in addition to, using the angled frame rail motor mounts 82.

Figure 11:
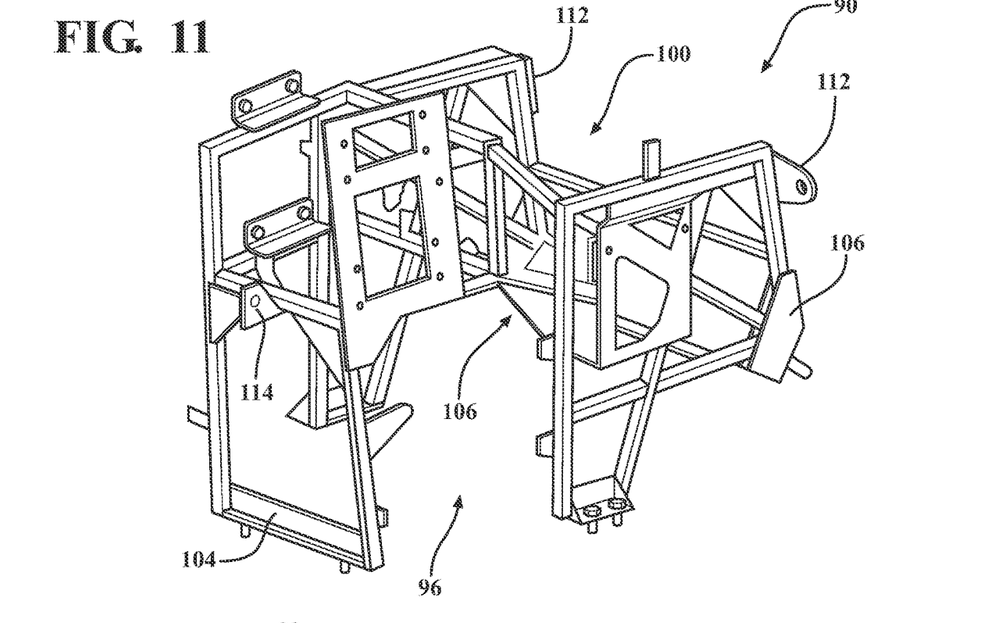
FIG. 11 is an isometric view of an exemplary powertrain carrier assembly according to a second aspect of the present technology.
Figure 12:
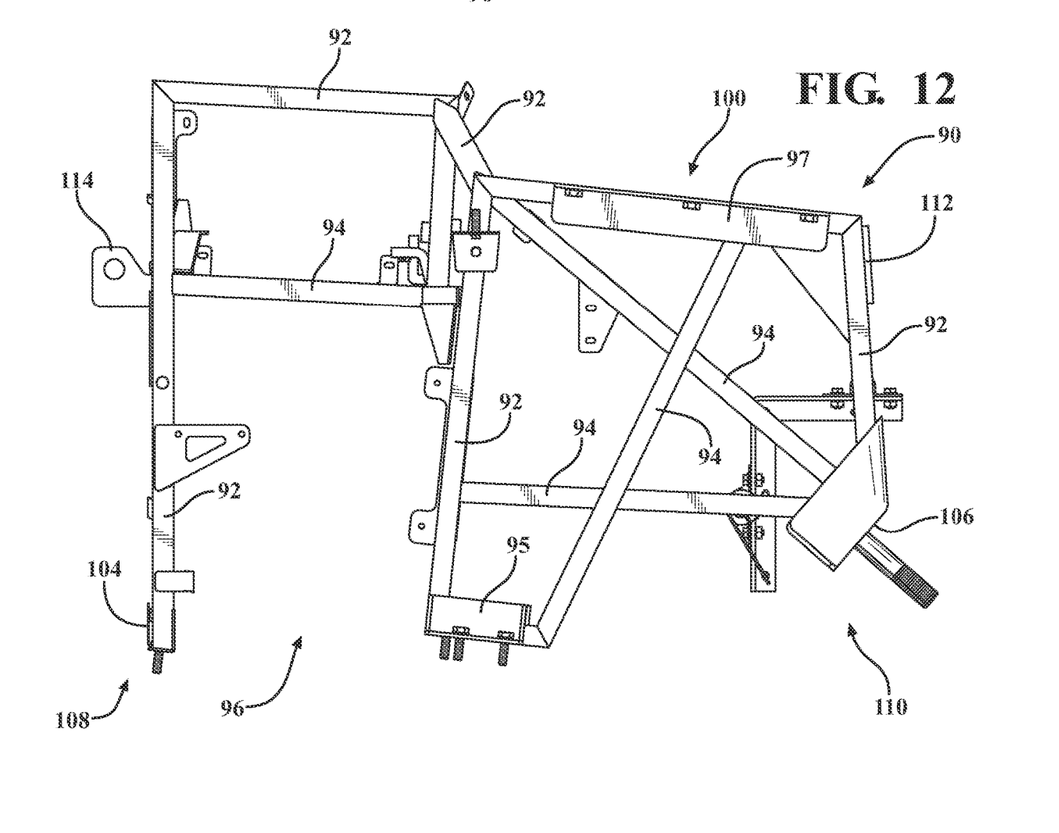
FIG. 12 is a side plan view of the powertrain carrier assembly of FIG. 11, with certain features removed for clarity in viewing.

FIG. 11 is an isometric view of another exemplary powertrain carrier assembly 90 according to a second aspect of the present technology. FIG. 12 is a side plan view of the powertrain carrier assembly 90 of FIG. 11, with certain features removed for clarity in viewing the assembly. The powertrain carrier assembly 90 of this aspect is similar to the powertrain carrier assembly 32 of FIGS. 2-10 with respect to being able to retrofit multiple fuel cells assemblies into a preexisting engine bay compartment of a heavy duty truck using a single manufacturing installation process. As shown in FIGS. 11 and 12, the powertrain carrier assembly 90 has a frame structure including a plurality of interconnected structural elements. By way of example, the interconnected structural elements may include various frame rails 92 and cross members 94 ultimately defining a lower interior cavity portion 96 configured to retain a first fuel cell assembly 98 within a lower region of the frame structure, connected with at least one bracket 95 one each side. The various frame rails 92 and cross members 94 also define an upper interior cavity portion 100 configured to retain a second fuel cell assembly 102 within an upper region of the frame structure, connected with at least one bracket 97 on each side. The interconnected structural elements of the frame structure may be high strength steel, or other high strength materials, and the preexisting engine bay compartment may have previously contained a diesel engine, for example, powering a Class 6-8 heavy duty truck.

The powertrain carrier assembly 90 may utilize a three point mounting system, as described above, with this design including at least one front body attachment bracket 104 configured to ultimately secure a front portion 108 of the powertrain carrier assembly 90 to a preexisting mounting point on a chassis frame cross member of the heavy duty truck. For example, attachment bracket 104 can be directly mechanically attached, i.e. bolted, to a front frame cross member. This type of connection can generally be analogous to the connection of front body attachment plate 52 as shown in FIG. 9. This type of connection may provide more flexibility when coupled to different types of vehicles.

The powertrain carrier assembly 90 may include a pair of opposing, rear body, angled attachment brackets 106 configured to secure a rear portion 110 of the powertrain carrier assembly 90 to preexisting frame rail motor mounts of the heavy duty truck, similar to those described in FIG. 10, with optional isolator components. Similar to the first aspect, a three point hoist lift system may be used to move the powertrain carrier assembly 90 loaded with the fuel cell assemblies into the appropriate location prior to completing the installation process, where it is connected to the chassis frame components of the heavy duty truck. In this regard, the frame structure may include a pair of hoist lift connection brackets 112 coupled to an upper rear portion 110 of the frame structure. A third hoist lift connection bracket 114 can be provided at an upper front portion of the frame structure.

Figure 13:
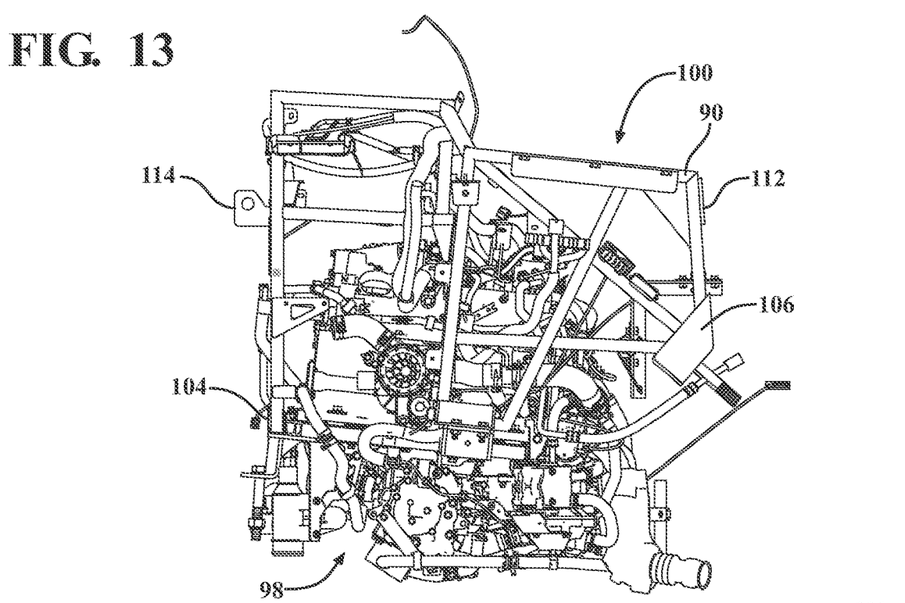
FIG. 13 is a side plan view of the powertrain carrier assembly of FIG. 11, with a first fuel cell assembly located therein.
Figure 14:
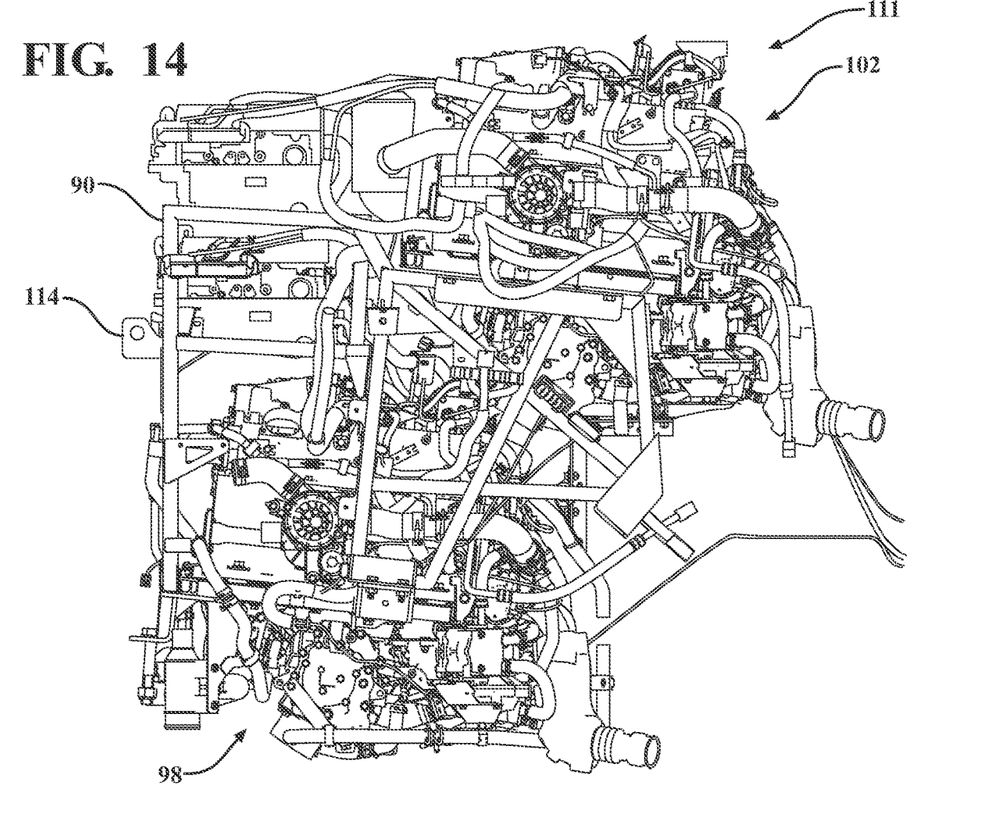
FIG. 14 is a side plan view of the powertrain carrier assembly of FIG. 13, further including a second fuel cell assembly located therein.

FIG. 13 is a side plan view of the powertrain carrier assembly of FIG. 11, with a first fuel cell assembly 98 located in the lower cavity 96. FIG. 14 is a side plan view of the powertrain carrier assembly of FIG. 13, further including a second fuel cell assembly 102 located in the upper cavity 100, providing what may be referred to as a complete fuel cell kit 111.

Figure 15:
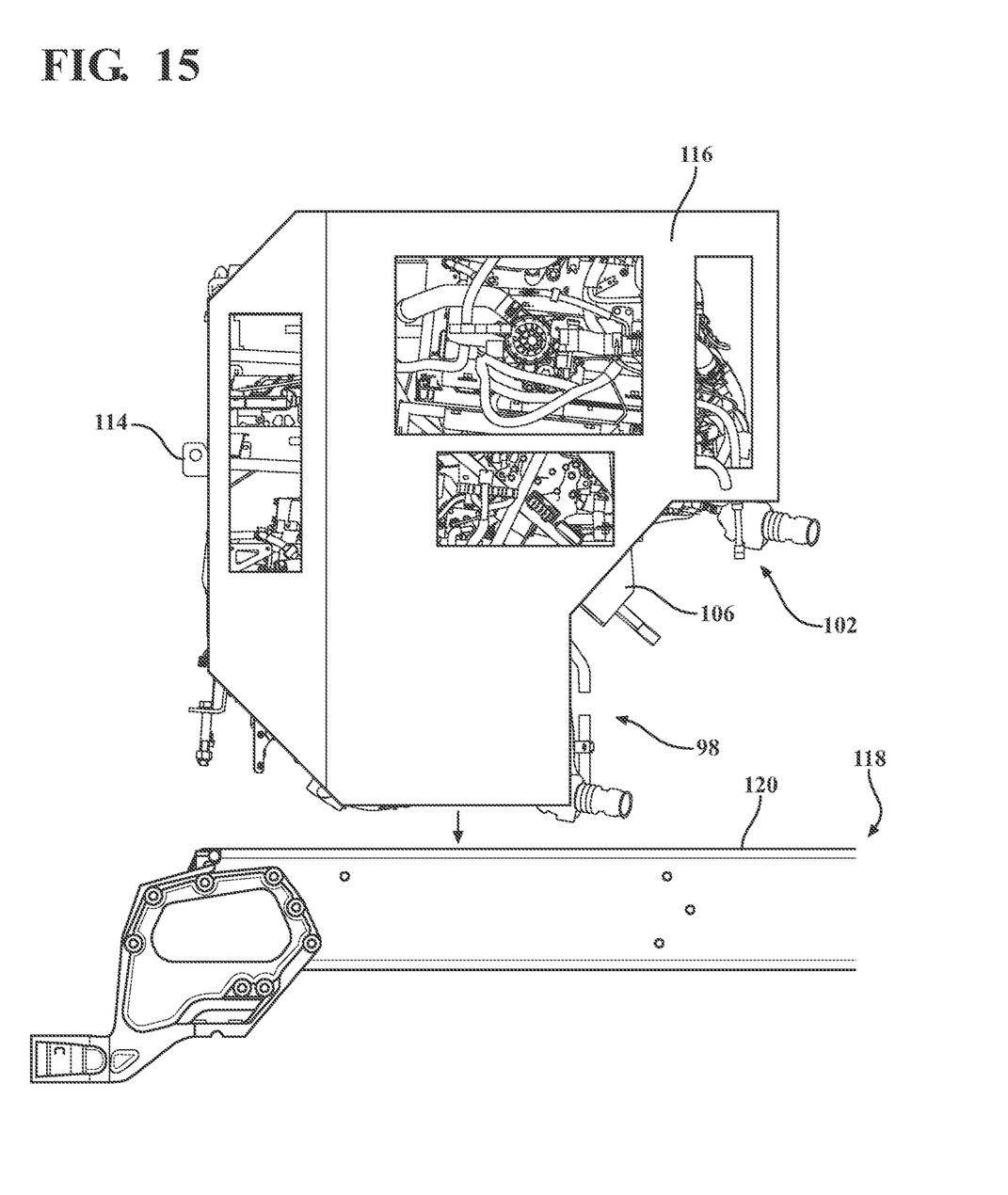
FIG. 15 illustrates the powertrain carrier assembly of FIG. 14, including an optional cover enclosure, being in a position to be lowered and mounted into a frame chassis of a heavy duty truck.

FIG. 15 illustrates the powertrain carrier assembly of FIG. 14 coupled with the fuel cell assemblies 98, 102, and including an optional cover enclosure 116, being in a position to be lowered and mounted into a frame chassis 118 of a heavy duty truck. For example, the front portion 108 may be mounted to a frame cross member 124 (FIGS. 16, 18), similar to that as shown in FIG. 9, and the pair of angled rear body attachment brackets 106 secure the rear portion 110 of the frame structure to angled frame rail motor mounts 122 (best shown in FIG. 16) extending from the opposing frame rails 120 of the frame chassis 118. Frame isolator components may be provided as described above. The optional cover enclosure 116 may be used to provide additional protection to the fuel cells, and also provides an area to add attachments to peripheral components, such as an air filter, electrical boxes, a battery, and the like. In various aspects, this may be used as a permanent covering for protection from the elements and unwarranted access.

Figure 16:
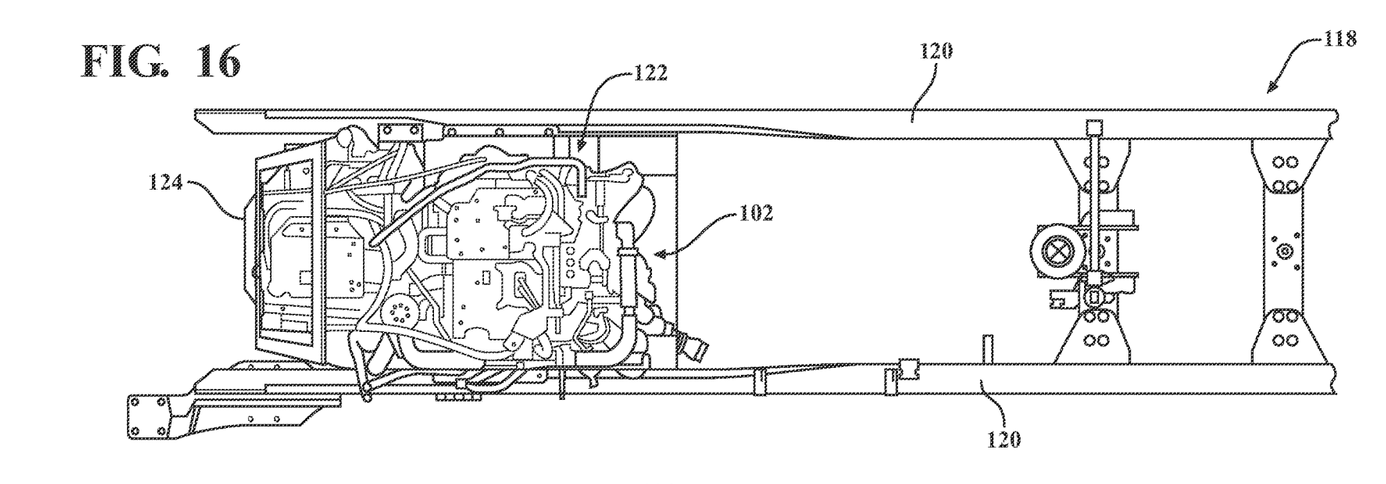
FIG. 16 is a top plan view of the powertrain carrier assembly of FIG. 15 mounted to the frame chassis of the heavy duty truck.
Figure 17:
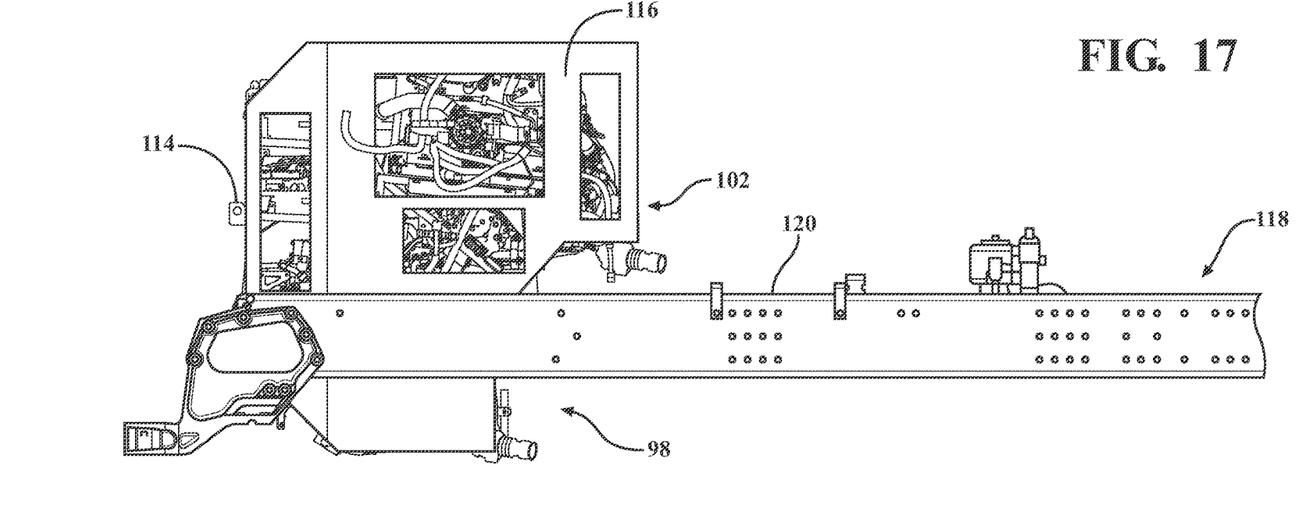
FIG. 17 is a side plan view of FIG. 16.
Figure 18:
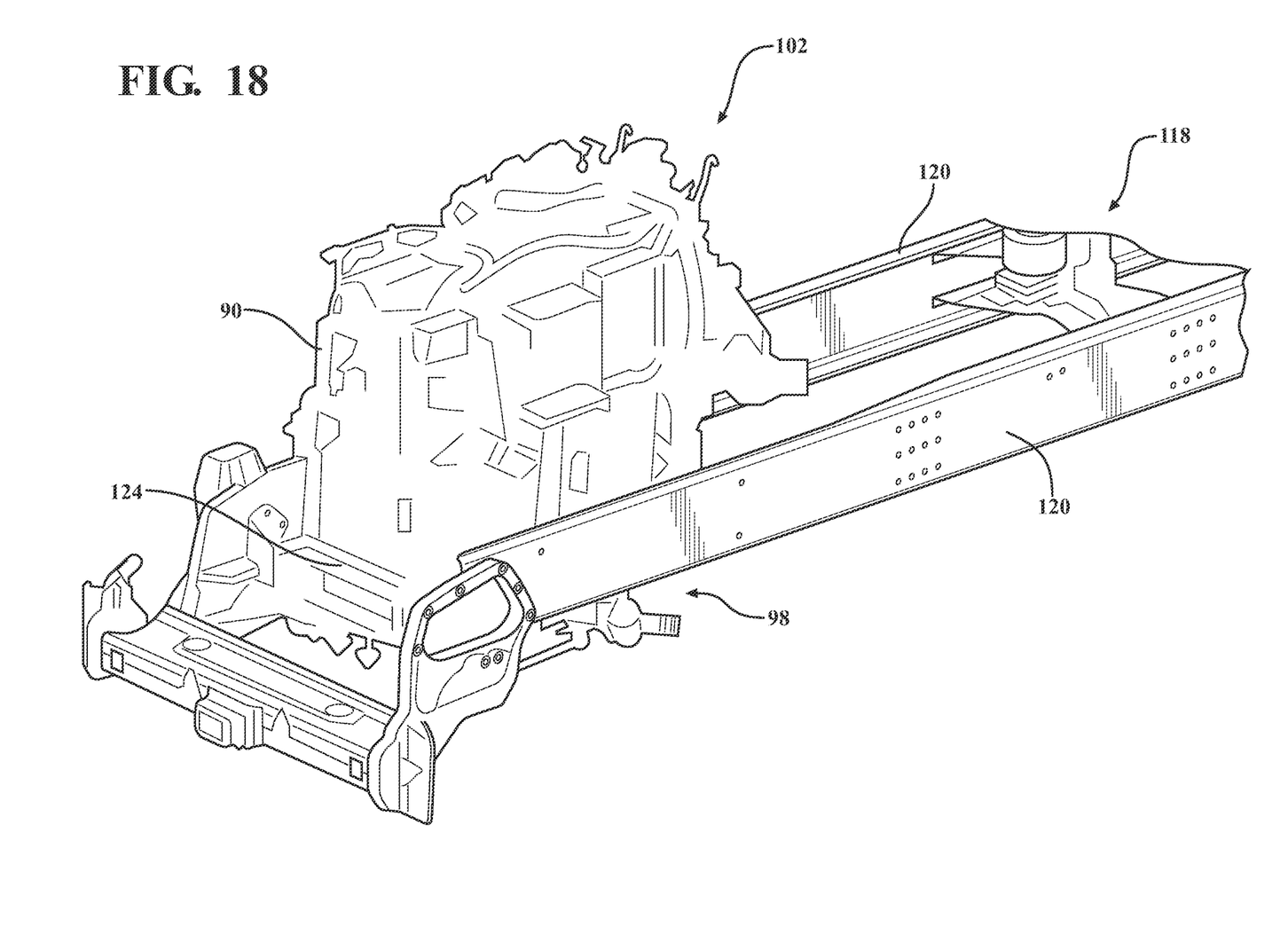
FIG. 18 is a partial isometric view of the powertrain carrier assembly of FIG. 15 mounted to the frame chassis of the heavy duty truck.

FIG. 16 is a top plan view of the powertrain carrier assembly of FIG. 15 mounted to the frame chassis 118 of the heavy duty truck; and FIG. 17 is a side plan view of FIG. 16. FIG. 18 is a partial isometric view of the powertrain carrier assembly of FIG. 15 mounted to the frame chassis 118 of the heavy duty truck, without the cover enclosure 116.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A powertrain carrier assembly for mounting multiple fuel cell assemblies in a heavy duty truck, the powertrain carrier assembly comprising:
   a frame structure including a plurality of interconnected structural elements defining a carrier platform;
   a front body attachment plate coupled substantially perpendicular to the frame structure and extending a distance below the carrier platform;
   a pair of rear body attachment brackets;
   a plurality of lower brackets fixed to the frame structure and configured to secure a first fuel cell assembly below the carrier platform;
   a plurality of upper brackets fixed to the frame structure and configured to secure a second fuel cell assembly above the carrier platform; and
   a carrier attachment bracket coupled to the front body attachment plate, the carrier attachment bracket being configured to secure a front portion of the powertrain carrier assembly to a frame component of the heavy duty truck.

2. The powertrain carrier assembly according to claim 1, wherein the front body attachment plate defines a mounting pattern of apertures configured to accommodate a secure connection to a variety of different original equipment manufacturer (OEM) carrier attachment brackets.

3. The powertrain carrier assembly according to claim 1, further comprising at least one isolator disposed between the carrier attachment bracket and the frame component of the heavy duty truck.

4. The powertrain carrier assembly according to claim 3, wherein the frame component of the heavy duty truck is a cross member disposed between two opposing frame rails and is provided with a preexisting mounting point.

5. The powertrain carrier assembly according to claim 1, wherein the rear body attachment brackets are angled with respect to the carrier platform and are configured to secure a rear portion of the frame structure to frame rail motor mounts of the heavy duty truck.

6. The powertrain carrier assembly according to claim 5, further comprising an isolator disposed between each rear body attachment bracket and the respective frame rail motor mounts.

7. The powertrain carrier assembly according to claim 1, further comprising a pair of hoist lift connection brackets coupled to a rear portion of the frame structure.

8. The powertrain carrier assembly according to claim 1, wherein the interconnected structural elements of the frame structure are high strength steel, comprising:
   a pair of opposing side rails;
   a plurality of cross members coupled to the opposing side rails; and
   at least one frame plate coupled to a rear portion of the opposing side rails.

9. The powertrain carrier assembly according to claim 1, wherein the plurality of interconnected structural elements of the frame structure comprise high strength steel.

10. A powertrain carrier assembly for retrofitting multiple fuel cell assemblies into a preexisting engine bay compartment of a heavy duty truck, the powertrain carrier assembly comprising:
    a frame structure including a plurality of interconnected structural elements defining a lower interior cavity portion configured to retain a first fuel cell assembly within a lower region of the frame structure, and defining an upper interior cavity portion configured to retain a second fuel cell assembly within an upper region of the frame structure;
    a front body attachment bracket configured to secure a front portion of the powertrain carrier assembly to a preexisting mounting point on a chassis frame cross member of the heavy duty truck;
    a pair of rear body angled attachment brackets configured to secure a rear portion of the powertrain carrier assembly to preexisting frame rail motor mounts of the heavy duty truck; and
    a three point hoist lift system comprising a pair of hoist lift connection brackets coupled to an upper rear portion of the frame structure and a third hoist lift connection bracket coupled to an upper front portion of the frame structure.

11. The powertrain carrier assembly according to claim 10, wherein the plurality of interconnected structural elements of the frame structure comprise high strength steel.

12. An electric powertrain heavy duty truck, comprising:
    a chassis frame including first and second opposing side frame rails, and a plurality of frame cross members coupled to the opposing side frame rails;
    an engine bay compartment;
    a first fuel cell assembly;
    a second fuel cell assembly; and
    a single powertrain carrier assembly for mounting or removing the first and second fuel cell assemblies in or from the engine bay compartment together at the same time, the powertrain carrier assembly comprising;
    a frame structure including a plurality of interconnected structural elements defining a carrier platform;

a front body attachment plate coupled substantially perpendicular to the frame structure and extending a distance below the carrier platform; and a carrier attachment bracket coupled to the front body attachment plate, the carrier attachment bracket being configured to secure a front portion of the powertrain carrier assembly to a frame component of the heavy duty truck.

13. The heavy duty truck according to claim 12, wherein the powertrain carrier assembly comprises a three point mounting system to secure the powertrain carrier assembly to the chassis frame, the three point mounting system including a front attachment point coupled to one of the frame cross members, and two angled rear attachment points coupled to the respective first and second opposing side frame rails.

14. The heavy duty truck according to claim 13, further comprising an isolator disposed between at least one attachment point and the chassis frame.

15. The heavy duty truck according to claim 12, wherein the powertrain carrier assembly comprises a three point hoist lift system to mount or remove the powertrain carrier assembly in or from the chassis frame, including a front hoist bracket, and two opposing angled rear hoist brackets.

16. The heavy duty truck according to claim 12, wherein the powertrain carrier assembly comprises:

a pair of opposing rear body attachment brackets;

a plurality of lower brackets fixed to the frame structure and configured to secure a first fuel cell assembly below the carrier platform; and a plurality of upper brackets fixed to the frame structure and configured to secure a second fuel cell assembly above the carrier platform.

17. The heavy duty truck according to claim 16, wherein the interconnected structural elements of the frame structure are high strength steel, comprising:

a pair of opposing side rails;

a plurality of cross members coupled to the opposing side rails; and at least one frame plate coupled to a rear portion of the opposing side rails.

18. The heavy duty truck according to claim 16, wherein the front body attachment plate defines a mounting pattern of apertures configured to accommodate a secure connection to a variety of different original equipment manufacturer (OEM) carrier attachment brackets.

19. The heavy duty truck according to claim 12, wherein the powertrain carrier assembly comprises:

a front body attachment bracket configured to secure a front portion of the powertrain carrier assembly to a preexisting mounting point on a chassis frame cross member of the heavy duty truck; and a pair of opposing rear body angled attachment brackets configured to secure a rear portion of the powertrain carrier assembly to preexisting frame rail motor mounts of the heavy duty truck.

* * * * *